United States Patent [19]
Hunt

[11] 3,735,740
[45] May 29, 1973

[54] AIR INJECTION SYSTEM FOR INTERNAL COMBUSTION ENGINES

[76] Inventor: John H. Hunt, 8030 S.E. Barbara Welch, Portland, Oreg.

[22] Filed: Apr. 20, 1971

[21] Appl. No.: 135,709

[52] U.S. Cl. ............................................. 123/26
[51] Int. Cl. ........................................... F02b 41/00
[58] Field of Search ................................. 123/26

[56] References Cited

UNITED STATES PATENTS

| | | | |
|---|---|---|---|
| 2,011,986 | 8/1935 | Schwarz | 123/26 |
| 2,994,310 | 8/1961 | Hopwood | 123/26 |

*Primary Examiner*—Wendell E. Burns
*Attorney*—Eugene M. Eckelman

[57] ABSTRACT

An air injection system arranged to admit air under pressure into the combustion chamber of an internal combustion engine for reducing waste products of combustion and also increasing the efficiency of the engine. A valve assembly is mounted on the engine for communication at one of its ends to the combustion chamber and for communication at its other end to a pressure supply line for admitting cold air to the valve. The valve assembly includes a ball valve and plunger which automatically control the flow of air from the pressure supply line into the combustion chamber. The valve mechanism is arranged such that air is admitted to the combustion chamber precisely as the piston approaches the end of the compression stroke. In a preferred arrangement, the valve housing has a base by means of which such housing is clamped in place by the existing spark plug, with ports being bored adjacent to the spark plug for directing the air into the combustion chamber.

2 Claims, 4 Drawing Figures

PATENTED MAY 29 1973
3,735,740
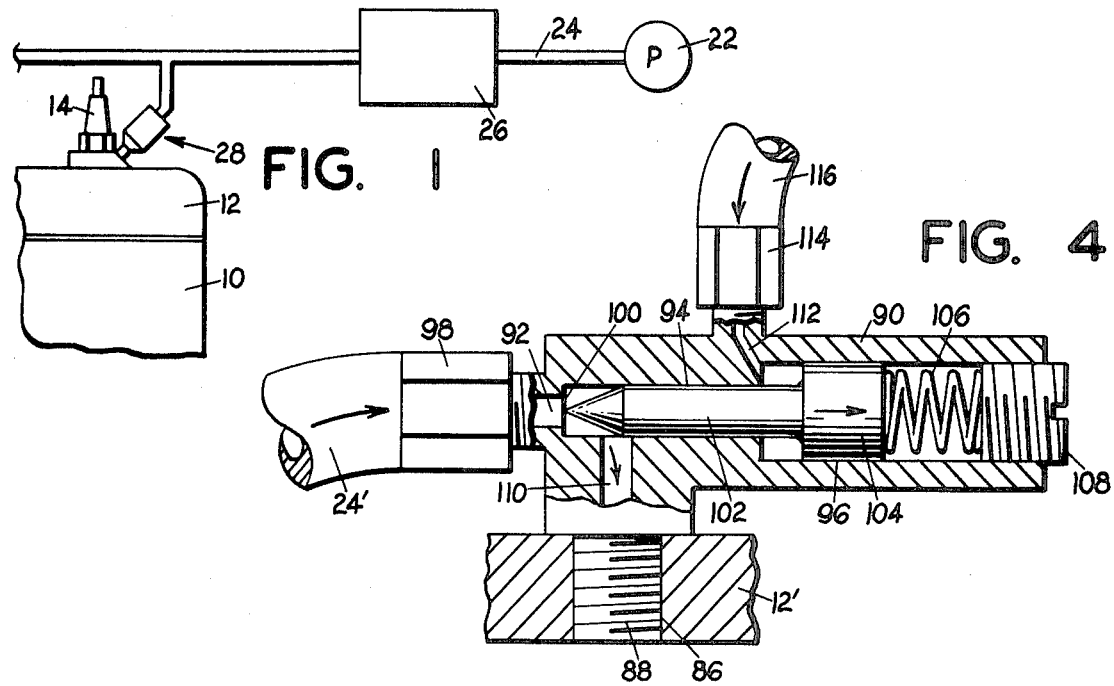
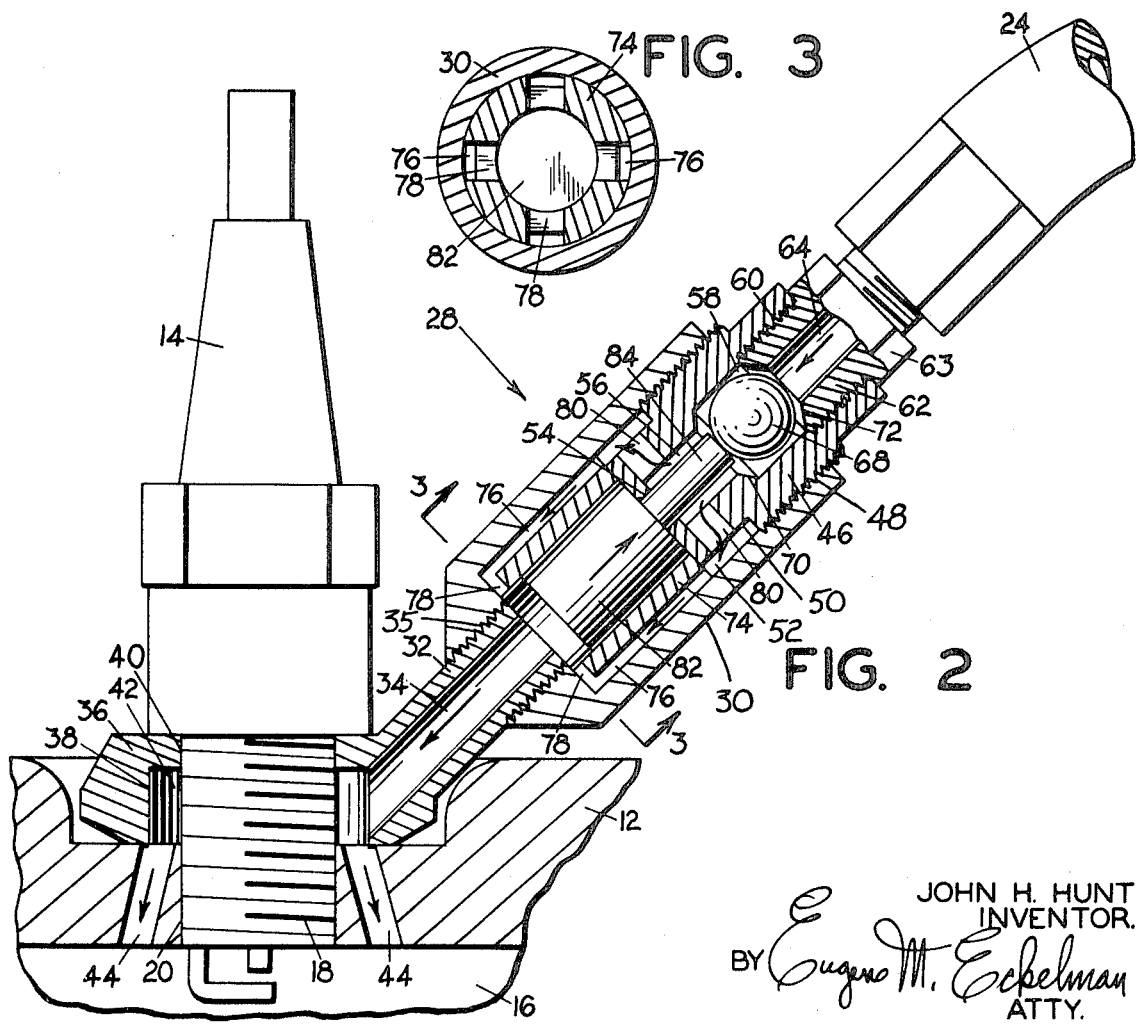
JOHN H. HUNT
INVENTOR.
BY Eugene M. Eckelman
ATTY.

3,735,740

AIR INJECTION SYSTEM FOR INTERNAL COMBUSTION ENGINES

BACKGROUND OF THE INVENTION

This invention relates to new and useful improvements in air injection systems for internal combustion engines.

It is well recognized that during the operation of internal combustion engines, a portion of the fuel remains unburned and is discharged from the exhaust system as pollutants. A reason for the inefficient burning is that there is insufficient air within the combustion chamber to permit complete combustion of all the fuel mixture introduced. Such inefficiency particularly exists during idling because of the rich fuel mixture required.

It has been found heretofore that more complete combustion and thus greater efficiency is accomplished by the introduction of air in addition to that in the air fuel mixture. Such prior systems have introduced such additional air during the expansion stroke or during the stroke immediately following ignition.

SUMMARY OF THE INVENTION

According to the present invention, there is provided an air injection system arranged to admit auxiliary air into a combustion chamber of an internal combustion engine during the compression stroke and preferably at a time when the piston approaches the end of such compression stroke, thus provides better combustion than mechanisms heretofore utilized.

Another object of the present invention is to provide an air injection system of the type described which employs compressed air means and a valve mechanism which controls the admission of the air into the combustion chamber automatically without driven or timing means.

Another object is to provide an air injection system of the type described having structure facilitating easy application to existing engines. In one embodiment, the device is clamped in place by the spark plug.

BRIEF DESCRIPTION OF THE DRAWINGS

FIG. 1 is a diagrammatic view of the present invention as applied to an engine;

FIG. 2 is a longitudinal sectional view of valve mechanism of the invention showing in detail its application to a vehicle engine;

FIG. 3 is a cross sectional view taken on the line 3—3 of FIG. 2; and

FIG. 4 is a longitudinal sectional view of a modified form of valve employing the concept of the present invention.

DETAILED DESCRIPTION OF A PREFERRED EMBODIMENT

Referring in particular to the drawings, and first to FIG. 1, the numeral 10 designates an internal combustion engine of conventional construction, having a head portion 12 and one or more spark plugs 14. A combustion chamber 16, FIG. 2, is associated with the spark plug and the latter has a bottom threaded shank 18 threadedly engaged with a tapped bore 20 in the head.

Forming a part of the present air injection system is an air pump 22 driven by the vehicle engine in a well known manner, such as from the fan belt. Pump 22 supplies air under pressure to a line 24 through a reserve tank 26 and is capable of supplying a pressure greater than the pressure existing in at least most of the compression stroke of the piston. Line 24 leads to a valve mechanism 28 forming a part of the present invention. Such line may extend to other valve mechanisms, not shown, in a multiple cylinder engine since each cylinder has its own valve mechanism.

With particular reference to FIGS. 2 and 3, valve mechanism 28 comprises a housing 30 having a bottom stem 32 provided with a passageway 34 therethrough. This stem may be cast as a part of the housing or have a threaded mounting 35 thereon as shown, and leads to an integral base 36 having a bottom opening recess 38 in communication with passageway 34. A smooth vertical bore 40 leads down through the top of the base 36 and is adapted to receive the threaded shank 18 of the spark plug, the recess 38 being of larger diameter than bore 40 so that an annular passageway 42 is provided around the shank of the spark plug in the base. The valve housing is supported on the head of the engine by clamping engagement of the base 36 by the spark plug, as illustrated in FIG. 2, and for the purpose of providing communication of the passageway 42 with the combustion chamber 16 the head 12 is provided with one or more ports 44 adjacent to the spark plug bore 20 and position so as to communicate at their upper ends with the passageway 42.

Valve housing 30 includes an insert 46 having a threaded connection 48 with the valve housing 30 at the end opposite from the stem 32. This insert has a bottom extension 50 below the threaded portion thereof which is of reduced diameter to provide an annular passageway 52 between such reduced portion and the inside surface of the valve housing.

Insert 46 has a bore 54 leading upwardly through the bottom thereof, and this bore communicates with a counterbore 56 in turn communicating with a counterbore 58 opening through the upper end of the insert. The upper end of counterbore 58 has a threaded connection 60 with a fitting 62 connected to air line 24. Fitting 62 has a head 63 between its ends and is provided with a bore 64 therethrough of smaller diameter than the counterbore 58.

Disposed in the counterbore 58 is a ball valve 68 adapted to operate between a lower seat 70 formed between counterbores 56 and 58 in the insert 46 and an upper seat 72 formed in the end of fitting 62. The ball valve 68 is smaller in diameter than the counterbore 58 so that air may bypass the said valve at selected times as will be described in greater detail hereinafter. The construction of the fitting 62 is such that when the fitting is threadedly engaged in the insert 46 with its head 63 abutted against the end of such insert, the seat 72 is selectively located in relation to the ball valve.

Contained in the lower portion of the valve housing 30 is a sleeve 74 having a plurality of longitudinal recesses 76 on its outer surface and bottom radially extending recesses 78 extending from respective ones of the recesses 76 to the inner portion of the sleeve. Recesses 76 and 78 form passageways for movement of air from passageway 52 to the lower portion of the sleeve 74 for flow through the stem 32. Annular passageway 52 communicates with the counterbore 56 by means of one or more radial ports 80 through the insert.

Slidably contained in the sleeve 74 is a plunger 82 having an upper integral stem 84 which projects through the bore 54 in the insert 46. The stem 84 is of a selected length such that when the plunger is raised, the finger engages the ball valve 68 and lifts it from its seat 70. The parts are shown in this position in FIG. 2. The tip of the finger is only slightly spaced from the ball in the down position of the plunger so that the ball is lifted almost simultaneously with the plunger. The parts are arranged, however, that in the upper position of the plunger, the ball is not pushed into the upper seat 72, whereby the ball cannot be driven into the seat by the plunger. Otherwise, change may be caused to the plunger and ball from the violent forces of combustion.

As stated above, the air pressure in line 24 is of selected pressure such that it is greater than the pressure which may exist in the combustion chamber during all of the compression stroke of the piston or at least through most of the compression stroke. Such air pressure will keep the ball valve 68 seated in all strokes of the piston except during the latter portion of the compression stroke and of course during firing. The ball valve during all the strokes except firing and the latter portion of the compression stroke will hold the plunger down against the bottom of the interior of housing 30 and no movement of gases from the combustion chamber thus exists upward past the top of the stem 32 during said mentioned times. As the piston moves up in its compression stroke, it will create a pressure sufficient to raise the plunger 82 in the direction of the arrow thereon in FIG. 2 to unseat the ball valve 68. Even though the pressure under the plunger is less than above the ball valve, such movement of the plunger results because of the enlarged bottom area thereof compared to the area of the ball exposed to the pressure in line 24. As the ball valve moves off the seat 70, a charge of fresh air from line 24 shoots past such valve into the combustion chamber via counterbore 56, radial ports 80, passageway 52, recesses 76 and 78, passageway 34 in stem 32, passageway 42 and through the posts 44 into the combustion chamber. As the ball valve moves off said seat, such charge of air also acts on the bottom of the plunger to assist in holding the plunger up, thus allowing a good charge of air to enter the combustion chamber.

As ignition occurs, the sudden burst of pressure, being greater than pressure in line 24, will exist in the opposite direction than that just described and it will seat ball valve 68 on its upper seat 72, to prevent backflow through the valve. As the piston in the engine starts its downward movement and the force of the combustion decreases, the ball 68 is forced down against its seat 70 by air pressure in the line 24. The plunger 82 is forced down by such ball to its lower position.

FIG. 4 illustrates an embodiment of the invention employing the same principles of the invention. In this embodiment, the numeral 12' designates the head of an internal combustion engine and the numeral 86 designates a tapped bore through the head which is made for installation of the device. Mounted in the bore 86 is a threaded shank 88 integral with a valve housing 90. This valve housing has a bore 92 communicating with a counterbore 94. Counterbore 94 communicates with another counterbore 96 opening through one end of the housing. Bore 92 has communication with a pressure line 24' from a pump, such as the pump shown in FIG. 1, through a suitable fitting 98. The juncture of bore 92 and counterbore 94 forms a valve seat 100 for a needle type valve 102 operating in the counterbore 94 and integrated with a plunger portion 104 operating in counterbore 96. The plunger 104 and its valve 102 are urged toward the bore 92 by a compression spring 106 confined between the plunger and an end plug 108 threadedly connected to the outer end of counterbore 96. A passageway 110 in the housing 90 and in the shank 88 establishes communication between the counterbore 94 and the end of the shank 88 namely, in the area of the combustion chamber. A passageway 112 leads from the forward end of counterbore 96 to an outer edge portion of the housing, and a fitting 114 establishes a connection between such portion of the housing and a line 116. Line 116 extends to the combustion chamber of another piston in the same engine.

As is well known, the pistons of multiple cylinder internal combustion engines operate in sequence such that when one piston is in its firing stroke another piston is in its compression stroke, and the arrangement of FIG. 4 is such that the firing pressure from one cylinder will open the valve 102 to allow air pressure to be admitted to the combustion chamber of a piston which is in its compression stroke. That is, it will be assumed that line 116 extends to one cylinder. When such cylinder is in its firing stroke the high pressure thereof will act on the forward end of plunger 104 and drive such plunger against the spring in the direction of the arrow on the plunger to unseat the valve 102 from valve seat 100. This allows a charge of fresh air from line 24 to be injected through bore 92, counterbore 94 and passageway 110 into the combustion chamber. Such movement of air is shown by arrows. As the pressure from the firing of the other piston subsides, the spring 106 will reseat the valve 102, it being understood of course that the spring 106 is of a strength to seat the valve against the pressure in line 24'.

In each of the embodiments of the invention, it is apparent that the charge of air is injected into the combustion chamber just before firing, namely, at a point toward the end of the compression stroke. Such has been found to produce greater efficiency than the introduction of air at other times. It is believed that such greater efficiency is the result of cold air being admitted into the combustion chamber at the most efficient time, namely, just before firing. The engine runs quiet and discharges a very small amount of waste products of combustion. It has been found that there is no preignition with a noticeable decrease in exhaust temperatures, and furthermore the spark plugs and other areas exposed to the combustion chamber are maintained in a clean condition. The system of the present invention can be applied to conventional automobiles, merely by providing ports 44 around the spark plug mounting bore 20. For the embodiment of FIG. 4, a tapped bore 86 is provided in the head at the combustion chamber. The pump 22 takes its supply of air out of the valve cover to produce the necessary lubrication for the valve and to ventilate the valve cover. The parts of the valve where necessary are formed from a metal with a high melting point to withstand the temperatures of combustion.

It is to be understood that the forms of my invention herein shown and described are to be taken as preferred examples of the same and that various changes in the shape, size and arrangement of parts may be restored to without departing from the spirit of my invention.

Having thus described my invention, I claim:

1. An air injection system for internal combustion engines comprising
   a. a valve housing having an inlet and an outlet,
   b. means arranged to connect the outlet of said valve housing to an internal combustion engine with said valve housing in communication with the combustion chamber of the engine,
   c. pressure supply means connected to the inlet of said valve housing providing a continuous supply of air under pressure, with the pressure thereof being greater than the pressure in the combustion chamber through at least most of the compression stroke of the piston in the combustion chamber,
   d. a ball valve in said valve housing controlling the flow of air through said valve housing,
   e. a plunger on the outlet side of said housing relative to said ball valve,
   f. a stem portion on said plunger arranged for engagement with said ball valve for unseating the latter,
   g. said plunger being arranged through its stem to unseat said ball valve by movement thereof toward said inlet end by a pressure from the combustion chamber which is less than the pressure in said pressure supply means whereby air is arranged to be admitted from said pressure supply to the combustion chamber during the compression stroke of the piston in the combustion chamber.

2. An air injection system in combination with an integral combustion engine having multiple cylinders, comprising
   a. a valve housing having an inlet and an outlet,
   b. means arranged to connect the outlet of said valve housing to an internal combustion engine with said valve housing in communication with the combustion chamber of the engine,
   c. pressure supply means connected to the inlet of said valve housing providing a continuous supply of air under pressure, with the pressure thereof being greater than the pressure in the combustion chamber throughout at least most of the compression stroke of the piston in the combustion chamber,
   d. control means in said valve housing arranged to admit air from said pressure supply to the combustion chamber during the compression stroke of the piston in the combustion chamber,
   e. and means connected between said valve housing and another cylinder of the engine in an arrangement whereby a stroke of said another cylinder operates said valve to admit air to the first mentioned cylinder.

* * * * *